(12) United States Patent
Boley (10) Patent No.: US 9,476,491 B2
(45) Date of Patent: Oct. 25, 2016

(54) LOCKUP CLUTCH FOR A TORQUE CONVERTER

(71) Applicant: Allison Transmission, Inc., Indianapolis, IN (US)

(72) Inventor: Larry E. Boley, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/294,632

(22) Filed: Jun. 3, 2014

(65) Prior Publication Data

US 2015/0345604 A1 Dec. 3, 2015

(51) Int. Cl.
*F16H 45/02* (2006.01)

(52) U.S. Cl.
CPC ......... *F16H 45/02* (2013.01); *F16H 2045/021* (2013.01); *F16H 2045/0215* (2013.01); *F16H 2045/0284* (2013.01)

(58) Field of Classification Search
CPC .......... F16H 45/021; F16H 2045/021; F16H 2045/0284; F16H 2045/0215; F16H 45/02; F16H 33/06; F16H 33/10; F16H 41/22; F16H 41/30
USPC ...................................................... 192/85.28
See application file for complete search history.

(56) References Cited

U.S. PATENT DOCUMENTS

| 4,382,496 | A | | 5/1983 | Yamamori et al. |
| 4,924,978 | A | * | 5/1990 | Ohkubo ......................... 192/3.3 |
| 5,964,329 | A | * | 10/1999 | Kawaguchi et al. .......... 192/3.3 |
| 6,367,605 | B1 | | 4/2002 | Middelmann et al. |
| 6,431,335 | B1 | | 8/2002 | Kundermann |
| 6,575,276 | B2 | | 6/2003 | Fukunaga et al. |
| 6,959,544 | B2 | | 11/2005 | Fukunaga et al. |
| 7,392,889 | B2 | * | 7/2008 | Ackermann ................. 192/3.29 |
| 2008/0121483 | A1 | * | 5/2008 | Sasse et al. .................... 192/3.3 |
| 2009/0139818 | A1 | | 6/2009 | Ishikawa et al. |
| 2012/0006642 | A1 | | 1/2012 | Greathouse et al. |

OTHER PUBLICATIONS

"International Search Report" and "Written Opinion of the International Searching Authority", mailed Feb. 17, 2015, 15 pages.

* cited by examiner

*Primary Examiner* — Ramya Burgess
*Assistant Examiner* — David Morris
(74) *Attorney, Agent, or Firm* — Taft Stettinius & Hollister, LLP; Stephen F. Rost (57) ABSTRACT

A torque converter for a powered vehicle, the torque converter including a cover coupled to an engine, and a piston moveably coupled to the cover to define a lockup cavity. The torque converter includes a converter cavity and an exhaust valve coupled to the converter cavity is configured to exhaust the converter cavity and lockup cavity of oil when the powered vehicle is placed in neutral or in park. A passage located in the cover enables oil located in the lockup cavity to move to the converter cavity to substantially eliminate oil located in the lockup cavity when the powered vehicle is placed in neutral or in park.

18 Claims, 5 Drawing Sheets

LOCKUP CLUTCH FOR A TORQUE CONVERTER

FIELD OF THE DISCLOSURE

The present invention relates to a torque converter for a transmission and, in particular, to a lockup clutch in a torque converter.

BACKGROUND

A torque converter is a fluid coupling that is used to transfer rotating power from a prime mover, such as an engine or electric motor, to a power-transferring device such as a transmission. The transmission is an apparatus configured to transmit power and torque from a vehicle's prime mover to a load-bearing device such as a drive axis. Conventional transmissions include a variety of gears, shafts, and clutches that transmit torque through the transmission at finite, stepped gear ratios.

Figure 1:
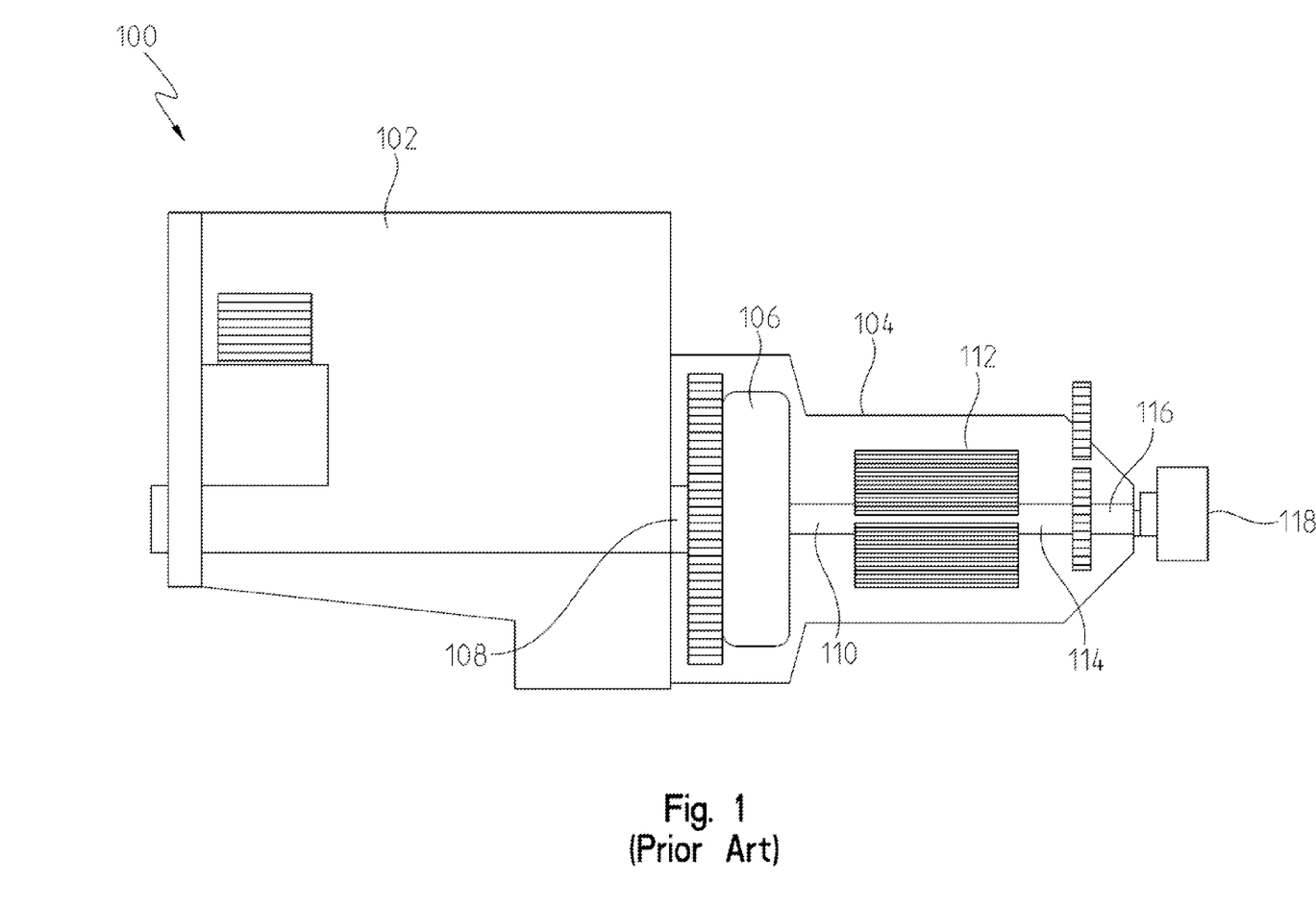
FIG. 1 is a schematic of an engine, a torque converter and a transmission system of the prior art.

Referring to FIG. 1, a conventional powered vehicle system 100 is shown with an internal combustion engine 102 (the prime mover), for example, configured to rotatably drive an output shaft 108 that is coupled to a pump shaft (not shown) of a conventional torque converter 106. The torque converter 106 provides a power input to a conventional transmission 104. The pump shaft (not shown) of the conventional torque converter 106 is coupled to an impeller or pump (not shown) that is rotatably driven by the output shaft 108 of the engine 102. The conventional torque converter 106 can further include a turbine (not shown) that is coupled to a turbine shaft 110. The turbine shaft 110 is coupled to, or integral with, a rotatable input shaft 114 of the conventional transmission 104. The conventional transmission 104 can include a planetary gear system 112 having a plurality of automatically selected gears. An output shaft 116 of the transmission 104 can be coupled to (or integral with) and rotatably drive a propeller shaft (not shown) that is coupled to a conventional universal joint of a vehicle via an output yoke 118 or the like. The conventional torque converter 106 can further include a lockup clutch assembly (not shown) that is located within the torque converter. The lockup clutch assembly directly connects the engine 102 to the input shaft 114 of the transmission 104. At cruising speed, the engine and the transmission are directly coupled together, which in turn increases fuel economy.

Conventional torque converters can operate in different modes, such as "converter mode" and "lockup mode". The operation of the torque converter in "converter mode" can occur, for example, during vehicle launch, low speed operation and certain shifting conditions. In "converter mode", the lockup clutch is disengaged and the pump rotates at the rotational speed of the engine output shaft while the turbine is rotatably actuated by the pump through a fluid interposed between the pump and turbine.

The operation of the conventional torque converter in "lockup mode" can occur, for example, when certain gears of the planetary gear system of the transmission are engaged. In this mode, the lockup clutch is engaged and the pump is coupled to the turbine so that the engine output shaft is directly coupled to the input shaft of the transmission.

There are different types of torque converters. Two of the different types of converters include a three-pass torque converter and a two-pass torque converter. The three-pass torque converter has an independent lockup piston cavity that is separate from a converter cavity inside the torque converter. As such, flow inside the torque converter through each cavity is independent. In particular, the independent lockup cavity provides the three-pass torque converter to have positive oil feed volume for lockup clutch apply. This is advantageous for three-pass torque converters because the lockup clutch apply procedure can be easily controlled regardless of a vehicle's driving condition.

A conventional two-pass torque converter has fewer components and is therefore less expensive to manufacture than a conventional three-pass torque converter. However, unlike the three-pass torque converter, the conventional two-pass torque converter does not have an independent lockup piston cavity that is separate from a converter cavity. Instead, the direction of oil flow in the two-pass torque converter is reversed when shifting between converter mode and lockup mode. This reversal of oil flow, however, can cause variability in the lockup apply pressure, particularly as the temperature of the oil varies and the vehicle operation changes.

When the transmission is placed in neutral with the engine running, the output of the transmission is disconnected from the wheels to insure that the wheels do not move. When the vehicle is braked, for instance at a stop light, the engine speed is at an idle speed which is insufficient to overcome the application of the brakes. In this condition, the output of the transmission remains connected to the wheels. In each of these situations, however, the turbine within the torque converter continues to spin since the pump continues to direct oil toward the turbine, albeit at much slower rate than when the vehicle is moving.

Even though the lockup piston is disengaged to insure that the turbine continues to spin freely, a certain amount of oil is located between the lockup piston and the torque converter cavity. The presence of this oil, under some conditions, is sufficient to generate friction between the torque converter cover and the piston. If this amount of friction is large enough, a sufficient amount of heat is generated which can wear and warp the components of the torque converter.

Consequently, there is a need to reduce the friction which can occur between the lockup piston and the cover, thereby reducing the wear and warping of the plates.

SUMMARY

In one exemplary embodiment of the present disclosure, a torque converter is provided for a powered vehicle. The converter includes an outer cover adapted to couple to an engine and a piston moveably coupled to the cover. The converter also includes a clutch disposed between the cover and piston. The clutch is moveable between an engaged position and a disengaged position.

In another embodiment, there is provided a torque converter for a powered vehicle including a transmission having a transmission shaft, defining a fluid carrying conduit to carry a fluid, and a prime mover, having an output shaft, wherein the transmission shaft and the output shaft define a longitudinal axis along the fluid carrying conduit. The torque converter includes a cover operatively coupled to the prime mover output shaft and to the fluid carrying conduit, wherein the cover defines a converter cavity configured to hold the fluid. A pump is disposed in the cover and is operatively coupled to the cover, wherein the pump is configured to displace the fluid within the converter cavity during movement of the cover. A turbine is disposed within the cover and is operatively coupled to the transmission shaft, wherein the turbine is configured to move the transmission shaft in response to the fluid displaced by the pump. A piston is disposed within the cover and is configured to define a lockup cavity between the cover and the piston, wherein the piston is configured to move with movement of the cover. A first passage is operatively coupled to the converter cavity and to the lockup cavity, wherein the passage is configured to direct the fluid between the converter cavity and the lockup cavity.

In a further embodiment, there is provided a powered vehicle including an engine and a transmission, wherein the transmission includes a turbine shaft defining a fluid carrying conduit to carry a fluid along a longitudinal axis. A torque converter is coupled between the engine and transmission. The converter includes a cover coupled to the engine, the cover defining a converter cavity and configured to hold the fluid. A piston is moveably coupled to the cover and includes a first side defining a lockup cavity between the piston and the cover and a second side disposed adjacent to the converter cavity. A first passage is operatively coupled to the converter cavity and to the lockup cavity, wherein the first passage is configured to direct the fluid between the converter cavity and the lockup cavity.

In still another embodiment, there is provided a torque converter for a powered vehicle including a transmission having a transmission shaft defining a fluid carrying conduit to carry a fluid and a prime mover having an output shaft. The transmission shaft defines a longitudinal axis along the fluid carrying conduit. The torque converter includes a cover coupled to the prime mover wherein the cover defines a converter cavity configured to hold the fluid. A piston is moveably coupled to the cover and includes a first side defining a lockup cavity between the piston and the cover and a second side disposed adjacent to the converter cavity. A first passage is operatively coupled to the converter cavity and to the lockup cavity, wherein the passage is configured to direct the fluid between the converter cavity and the lockup cavity.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

This disclosure describes a torque converter with an improved torque converter and a piston assembly configured to reduce or eliminate damage which can occur to a torque converter occurring when a prime mover of a vehicle is idling in either park or neutral.

Figure 2:
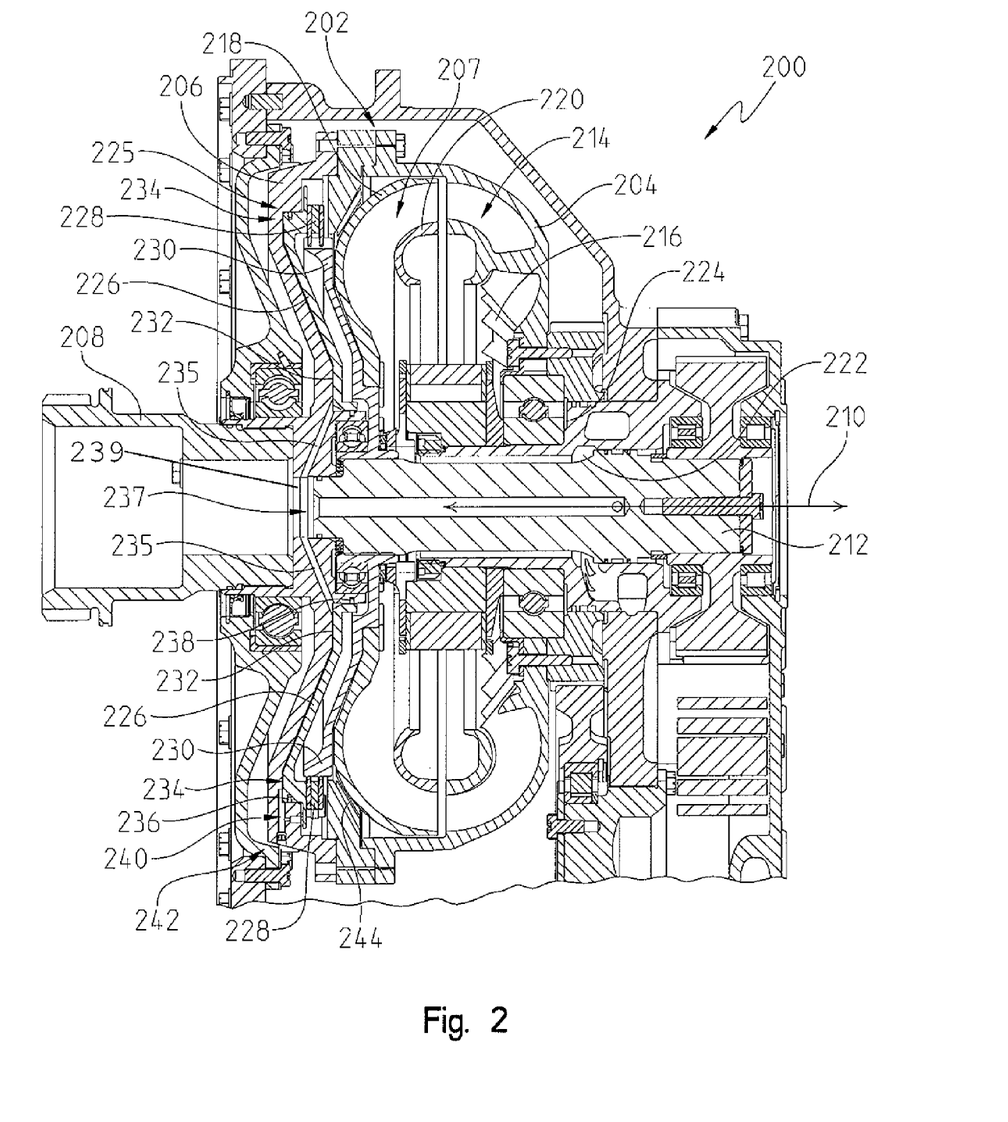
FIG. 2 is a schematic cross-sectional view of a of a torque converter including a passage configured to fluidically couple a lockup cavity to a converter cavity.

FIG. 2 illustrates one embodiment of a torque converter 200. The converter 200 includes a cover 202 including a first section 204 and a second section 206. The first section 204 and the second section 206 define a torque converter cavity 207. The cover 202 is operatively coupled to an engine drive shaft 208 which is fixed to the second section 206 such that rotation of the drive shaft 208 rotates the second section 206 and the first section 204 about a longitudinal axis 210 defined by a transmission shaft 212 and the engine drive shaft 208. The cover 202 rotates at the same speed as that of the engine.

The first section 204 of the cover 202 includes a pump 214 defined by a plurality of veins 216. The second section 206 of the cover 202 includes a turbine 218. Disposed between the pump 214 and the turbine 218 is a stator 220. During operation of the torque converter 200, a fluid, in particular oil, is located within the cavity 207 and is displaced by the pump 214 within the cavity 207 through rotation of the drive shaft 208. As is understood by those skilled in the art, the pump 214 directs the oil towards the turbine 218 which rotates in response thereto. Because the turbine 218 is fixed to the shaft 212, the shaft 212 responsively rotates which in turn moves the wheels or tracks of the vehicle. The stator 220, which is located between the pump 214 and the turbine 218, provides for continued circulation of the oil within the cavity 207. The oil is provided by a fluid supply circuit, not shown, which supplies oil to the cavity 207 through a cavity 222 disposed between the shaft 212 and a support section 224 of the torque converter 200.

While the vehicle is moving at a speed determined by an operator, the oil within the chamber 207 continues to move from the pump 214 to the turbine 218 such that the speed of the turbine 218 and therefore the rotational speed of the shaft 212 is controlled indirectly by the speed of the drive shaft 208 due to the movement of the oil. The higher the speed of the drive shaft 208, the more quickly the pump 214 moves oil toward the turbine 218, to increase the rotational speed of the transmission shaft 212. Oil pressure within the torque converter cavity 207 is maintained by the fluid circuit delivering and receiving fluid through the cavity 222. During this type of operation, the turbine 218 rotates in response the movement of the pump and is disconnected from any direct or indirect contact with the cover 202.

During operation of the torque converter 200 at a time determined by the operator or by the speed of the pump 214, a lockup clutch 225 connects the turbine 218 to the cover 202. The lockup clutch includes a lockup piston 226, located adjacently to the second section 206, a friction plate or friction plates 228, and a clutch hub 230. The lockup piston 226 moves into contact with the friction plate 228 supported by the clutch hub 230. The piston 226 includes a length which extends from the longitudinal axis 210 and along the second section 206. The clutch hub 230 includes a length which extends from the shaft 212 along the turbine 218. The clutch hub 230, in different embodiments, is fixed to the turbine 218, the shaft 212, or both and rotates with rotation of the turbine 218. As the piston 226 moves into contact with the friction plate 228, the turbine 218 becomes fixed to the second section 206 and is thereby fixed to the cover 202. In this condition, the turbine 218 rotates at the same speed as the drive shaft 208.

The lockup piston 226 moves into contact with the friction plate 228 in response to the fluid filling a lockup cavity 232 which is provided between the second section 206 of the cover 202 and the piston 226. As the fluid fills the cavity 232, an end 234 of the piston 226 moves into contact with the friction plate 228. A seal 236 provides a fluid seal between the end 234 and a portion of the second section 206 disposed toward the friction plates 228. Another seal 238 provides a fluid seal between another end of the piston 226 and the second section 206.

Fluid flow into to the lockup cavity 232 is provided by one or more passages 235 which are disposed in the second section 206. In one embodiment, the second section includes four passages 235. In other embodiments, different numbers of passages are included. The passages 235 are fluidically coupled to a fluid carrying conduit 237 disposed in the shaft 212. The second section 206 also defines a chamber 239 disposed at an end of the fluid carrying conduit. Fluid flow from the conduit 237 and into the lockup cavity 232 provides for pressurization of the cavity 232 during lockup.

If the operator slows the vehicle or stops the vehicle to put the transmission in either the park or the neutral position, the piston 226 is moved out of contact with the friction plate 228 so that the turbine 218 is disconnected from the cover 202 and moves again in response to fluid flow developed by the pump 214. The pressure of the oil within the lockup cavity 232 is reduced to enable the piston 226 to move out of contact with the friction plates.

When the vehicle transmission is placed in neutral or in park, the torque converter cavity 207 and the lockup cavity 232 are each exhausted of oil. To evacuate the oil from the lockup cavity 232, a passage 240 is configured to operatively couple the lockup cavity 232 to the torque converter cavity 207. The passage 240 provides for the flow of fluid between the lockup cavity 232 and the torque converter cavity 207. In one embodiment, the passage 240 is located at an end 242 of the second section 206 which is disposed toward the end 234 of the piston 226. In one embodiment, a single passage 240 is included in the second section 206. In other embodiments, more than one passage is included in the second section 206. The oil located in the lockup cavity moves during evacuation from the lockup cavity 232, through the passage 240, past the friction plate 232, through a space 244 located between the first section 204 and the turbine 218, to an exterior sump (not shown). By evacuating the oil through the passage 240, a substantial amount or all of the oil located previously in the lockup cavity 232 is exhausted.

By substantially eliminating or removing all of the oil from each of the cavities, an annulus or film of oil within the lockup cavity 232 is removed thereby substantially reducing or eliminating any pressure which could move the piston 226 toward the friction plates 228. If this pressure were to remain, an undesirable force is applied to the components of the torque converter. In addition, the pressure can be sufficient to move piston 226 into unwanted contact with the friction plates. Consequently, the passage 240 improves the operation of the torque converter by reducing or eliminating warp or wear which can occur in the presence of undesirable pressures in the lockup cavity 232.

Figure 3:
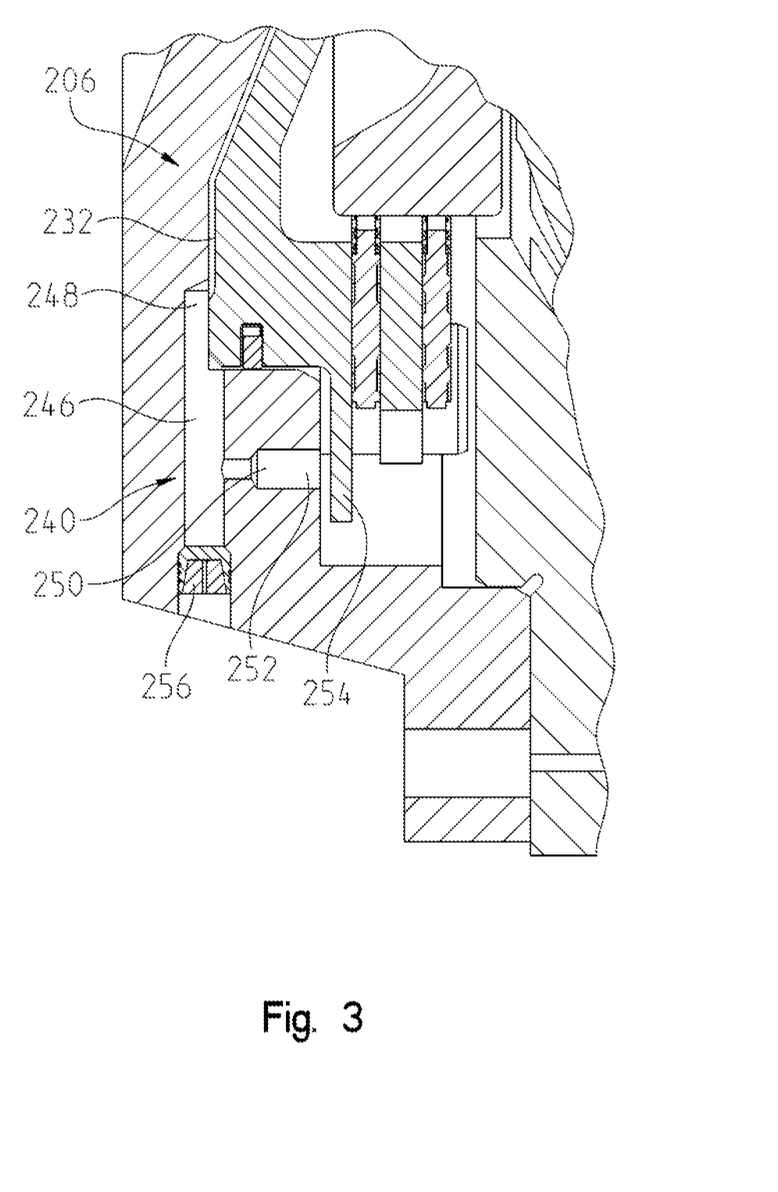
FIG. 3 is a partial schematic cross-sectional view of a passage located in a cover to the torque converter wherein the passage is disposed adjacently to a piston.

FIG. 3 illustrates a portion of the second section 206 including the passage 240. The passage 240, in the illustrated embodiment, includes a first portion 246 having an end 248 disposed adjacent to the lockup cavity 232 and a second portion 250 having an end 252. The end 252 is disposed adjacent to a portion 254 of the piston 226. In one embodiment, the first portion 246 and the second portion 250 are machined in the second section 206 at substantially a right angle to one another. A plug 256 is disposed at another end of the first portion 246 to direct fluid flow from the lockup cavity 232 to the torque converter cavity 207 as previously described.

In one embodiment, the operating pressure in the torque converter cavity 207 during general operation is about 40 pounds per square inch (psi). During lock-up mode when the piston 226 is in contact with the friction plates 232, the pressure within the lockup cavity 232 is about 150 psi.

Figure 4:
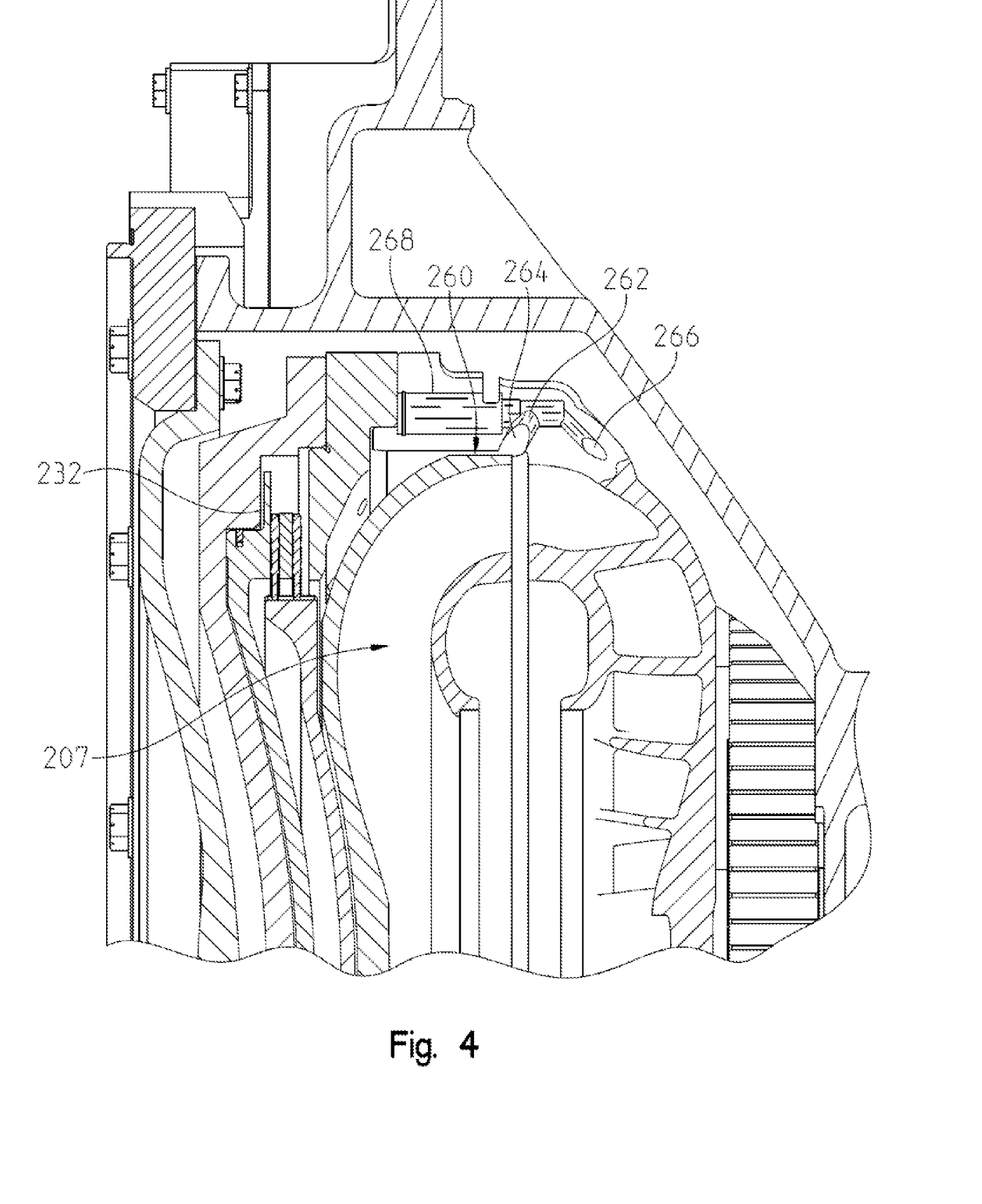
FIG. 4 is a schematic cross-sectional view of fluid conduit fluidically coupled to a lockup cavity, a converter cavity, and which extends externally from a torque converter.

FIG. 4 is a schematic cross-sectional view of a fluid path 260 configured to evacuate the lockup cavity 232 and the torque converter cavity 207 at the same time. As illustrated in FIG. 4, a conduit 262 includes a dimension sufficient to evacuate the fluid in the lockup cavity 232 and the torque converter cavity 207 at a portion 264 of the conduit 262. The portion 264 includes a sufficient size configured to fluidically couple the fluid in the lockup cavity 232 and converter cavity 207 for evacuation through a conduit 266 to a sump (not shown). A solenoid conduit 268 includes a solenoid valve which is electrically coupled to a control line configured to open and to close the solenoid and to thereby close the passage 266 or to open the passage 266 to provide for evacuation of the lockup cavity 232 and the torque converter cavity 207.

Figure 5:
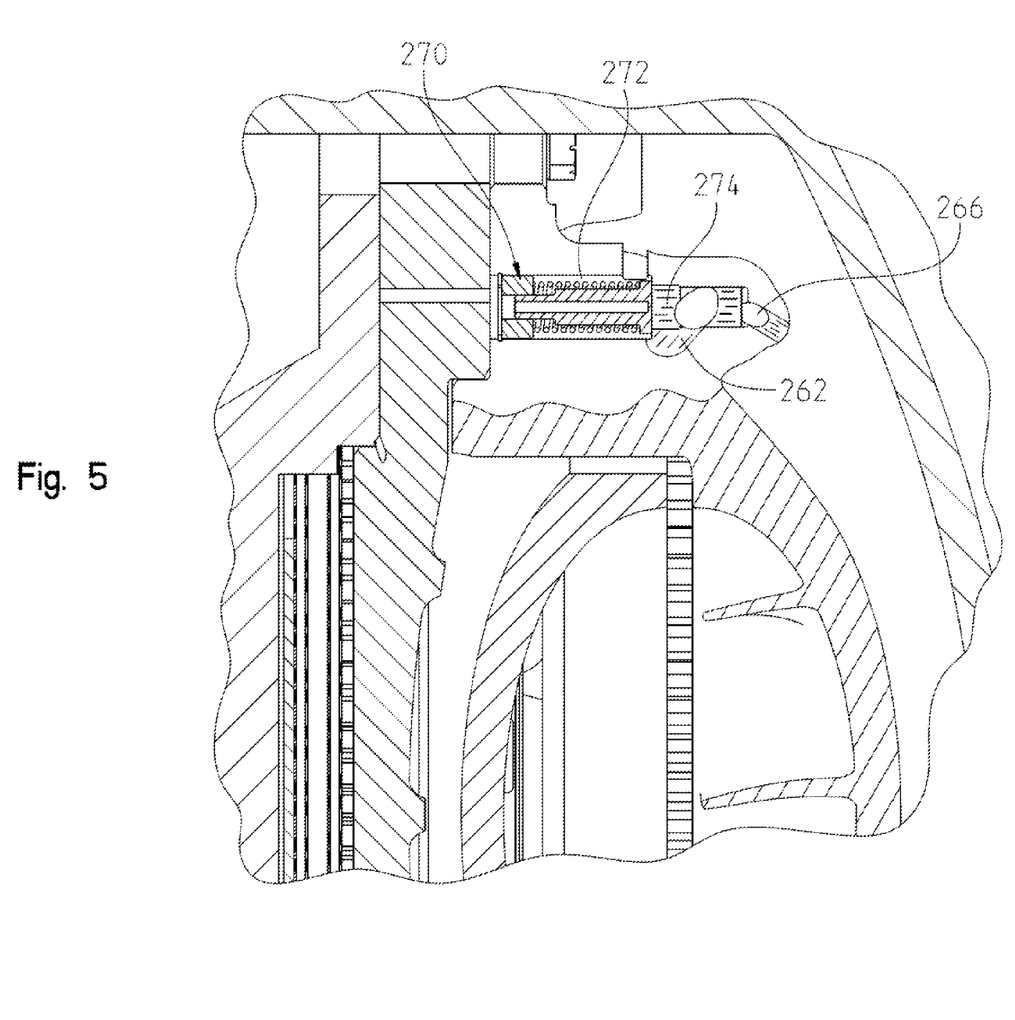
FIG. 5 is a partial schematic cross-sectional view of an exhaust solenoid operatively connected to a fluid conduit which extends externally from a torque converter.

FIG. 5 is a partial schematic cross-sectional view of an exhaust solenoid valve 270 located in the solenoid conduit 268 of FIG. 4. The exhaust solenoid 270 is fixedly mounted to the cover 202 and includes a coil 272 configured to move a plunger 274 along the longitudinal axis of the solenoid 270. The plunger 274 is configured to enable or to restrict fluid flow through the conduit 262 and 266. By movement of the plunger evacuation of the torque converter cavity 207 and lockup cavity 232 is provided. The exhaust solenoid valve 270 provides for the controller evacuation of the lockup cavity 232 in neutral or in park.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A torque converter for a powered vehicle including a transmission having a transmission shaft defining a fluid carrying conduit to carry a fluid and a prime mover having an output shaft, wherein the transmission shaft and the output shaft define a longitudinal axis along the fluid carrying conduit, the torque converter comprising:

a cover operatively coupled to the prime mover output shaft and to the fluid carrying conduit, wherein the cover defines a converter cavity configured to hold the fluid;

a pump disposed in the cover and operatively coupled to the cover, wherein the pump is configured to displace the fluid within the converter cavity during movement of the cover;

a turbine disposed within the cover and operatively coupled to the transmission shaft, wherein the turbine is configured to move the transmission shaft in response to the fluid displaced by the pump;

a hub extending from the transmission shaft and having a friction plate at one end thereof;

a piston extending along the hub and disposed within the cover and configured to define a lockup cavity between the cover and the piston, wherein the piston is configured to move with movement of the cover and includes a contact portion and a deflector portion defining a terminating end of the piston and extending from the contact portion, wherein the deflector portion is located between the cover and the friction plate; and a passage disposed in the cover and operatively coupled to the converter cavity and to the lockup cavity, wherein the passage is configured to direct the fluid between the converter cavity and the lockup cavity, wherein the passage includes an opening configured to direct a flow of fluid and the opening is located immediately adjacent to the deflector portion.

2. The torque converter of claim 1 wherein the cover includes a first section disposed immediately adjacent to the pump and a second section displaced from the pump, wherein the turbine is located between the second section and the pump, and wherein the second section, the turbine, the pump, and the first section are arranged along the longitudinal axis in consecutive order.

3. The torque converter of claim 2 wherein the second section defines the passage and the passage includes a first passage operatively connected to the fluid carrying conduit and to the lockup cavity.

4. The torque converter of claim 3 wherein the piston includes a first end and a second end, wherein the second end of the piston is fluidically sealed with the second section and the first end is configured to move away from the second section and includes the contact portion and the deflector portion extending from the contact portion.

5. The torque converter of claim 4 wherein the passage includes a second passage defining the opening.

6. The torque converter of claim 5 wherein the second section includes the first passage having a first end and a second end, wherein the first end is disposed at a chamber of the second section aligned along the longitudinal axis and the second end is disposed adjacent to the second end of the piston.

7. The torque converter of claim 6 wherein the first end and the second end of the piston each respectively include a first seal and a second seal, wherein the first seal, the piston, and the second seal define the lockup cavity with respect to the second section.

8. The torque converter or claim 7 wherein the second passage extends through the second section from the lockup cavity to the converter cavity.

9. A powered vehicle, comprising:

an engine and a transmission, the transmission including a turbine shaft defining a fluid carrying conduit to carry a fluid along a longitudinal axis;

a torque converter coupled between the engine and transmission, the converter comprising:

a cover coupled to the engine, the cover defining a converter cavity and configured to hold the fluid;

a piston moveably coupled to the cover, the piston including a first side defining a lockup cavity between the piston and the cover and a second side disposed adjacent to the converter cavity, wherein the piston includes a contact portion and a deflector portion defining a terminating end of the piston and extending from the contact portion, wherein the deflector portion is located between the cover and the friction plate; and a passage operatively coupled to the converter cavity and to the lockup cavity, wherein the passage is configured to direct the fluid between the converter cavity and the lockup cavity and includes an opening located immediately adjacent to the deflector portion and configured to direct a flow of fluid to the deflector portion, wherein the cover defines the passage and the passage extends through the cover to fluidically connect the lockup cavity to the converter cavity.

10. The powered vehicle of claim 9 wherein the piston includes a first end including a first seal and a second end including a second seal, wherein the first seal, the piston, and the second seal define the lockup cavity.

11. The powered vehicle of claim 10 wherein the passage includes a first passage and a second passage, and the second passage is located adjacent to the first end of the piston.

12. The powered vehicle of claim 11 wherein the first end of the piston includes the deflector portion disposed adjacently to the second passage.

13. The powered vehicle of claim 12 wherein the cover includes the first passage having a first end and a second end, wherein the first end is disposed at a chamber defined by the cover and aligned along the longitudinal axis and the second end is disposed adjacent to the second end of the piston.

14. A torque converter for a powered vehicle including a transmission having a transmission shaft defining a fluid carrying conduit to carry a fluid and a prime mover having an output shaft, wherein the transmission shaft defines a longitudinal axis along the fluid carrying conduit, the torque converter comprising:

a cover coupled to the prime mover, the cover defining a converter cavity and configured to hold the fluid;

a piston moveably to the cover, the piston including a first side defining a lockup cavity between the piston and the cover and a second side disposed adjacent to the converter cavity wherein the piston includes a contact portion and a deflector portion defining a terminating end of the piston and extending from the contact portion, wherein the deflector portion is located between the cover and the friction plate; and a passage operatively coupled to the converter cavity and to the lockup cavity, wherein the passage is configured to direct the fluid between the converter cavity and the lockup cavity, cavity and includes an opening located immediately adjacent to the deflector portion and configured to direct a flow of fluid to the deflector portion, wherein the cover defines the passage and the passage extends through the cover to fluidically connect the lockup cavity to the converter cavity.

15. The torque converter of claim 14 wherein the piston includes a first end including a first seal and a second end including a second seal, wherein the first seal, the piston, and the second seal define the lockup cavity.

16. The torque converter of claim 15 wherein the passage includes a first passage and a second passage, the second passage is located adjacent to the first end of the piston.

17. The torque converter of claim 16 wherein the first end of the piston includes the deflector portion disposed adjacently to the second passage.

18. The torque converter of claim 17 wherein the cover includes the first passage having a first end and a second end, wherein the first end of the first passage is disposed at a chamber defined by the cover and aligned along the longitudinal axis and the second end of the first passage is disposed adjacent to the second end of the piston.

* * * * *